(12) United States Patent
Kuroda et al.

(10) Patent No.: US 7,102,149 B2
(45) Date of Patent: Sep. 5, 2006

(54) METHOD OF INSPECTING STRAY LIGHT THAT OCCURS IN A RADIATION IMAGE READER

(75) Inventors: Osamu Kuroda, Kaisei-machi (JP); Hiroyuki Karasawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/801,773

(22) Filed: Mar. 9, 2001

(65) Prior Publication Data

US 2001/0020689 A1 Sep. 13, 2001

(30) Foreign Application Priority Data

Mar. 9, 2000 (JP) .............................. 2000-065274

(51) Int. Cl.
*G03B 42/08* (2006.01)

(52) U.S. Cl. .................. 250/584; 250/586; 250/587

(58) Field of Classification Search ............... 250/584, 250/586, 587
See application file for complete search history.

(56) References Cited

U.S. PATENT DOCUMENTS

| | | | |
|---|---|---|---|
| 4,258,264 A | 3/1981 | Kotera et al. | 250/585 |
| 4,276,473 A | 6/1981 | Kato et al. | 250/587 |
| 4,315,318 A | 2/1982 | Kato et al. | 382/264 |
| 5,420,441 A * | 5/1995 | Newman et al. | 250/581 |
| 5,591,968 A * | 1/1997 | Grillet | 250/252.1 |
| 6,231,231 B1* | 5/2001 | Farrokhnia et al. | 378/207 |

FOREIGN PATENT DOCUMENTS

| | | |
|---|---|---|
| JP | 55-12429 | 1/1980 |
| JP | 55-116340 | 9/1980 |
| JP | 55-163472 | 12/1980 |
| JP | 56-11395 | 2/1981 |
| JP | 56-164645 | 12/1981 |

* cited by examiner

*Primary Examiner*—David Porta
*Assistant Examiner*—Shun Lee
(74) *Attorney, Agent, or Firm*—Sughrue Mion, PLLC

(57) ABSTRACT

The inspection method comprises: preparing a storage fluorescent inspection sheet that has stored and recorded a radiation inspection image which has a density pattern in which one or more low-density and high-density regions having a contrast difference of at least 1:20 are arrayed in a horizontal scanning direction; obtaining an image inspection signal representing the radiation inspection image, by photoelectrically reading the radiation inspection image from the storable fluorescent inspection sheet; and inspecting the influence of stray light, based on an image reproduced from the image inspection signal. An inspection image plate has contrast differences of high-density and low-density regions of at least 1:20.

8 Claims, 16 Drawing Sheets

F I G . 5
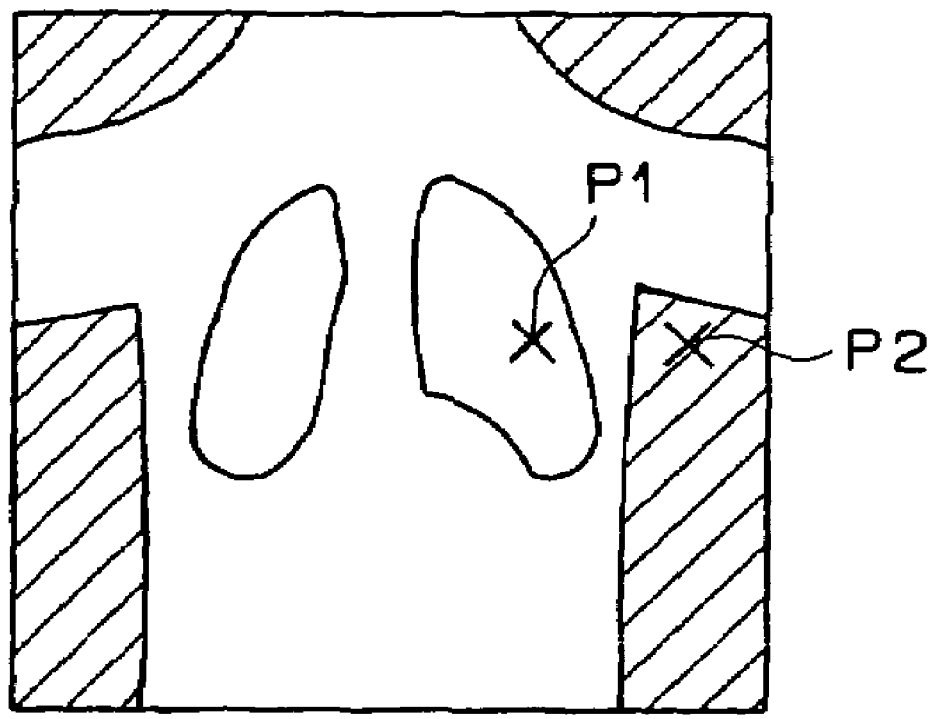

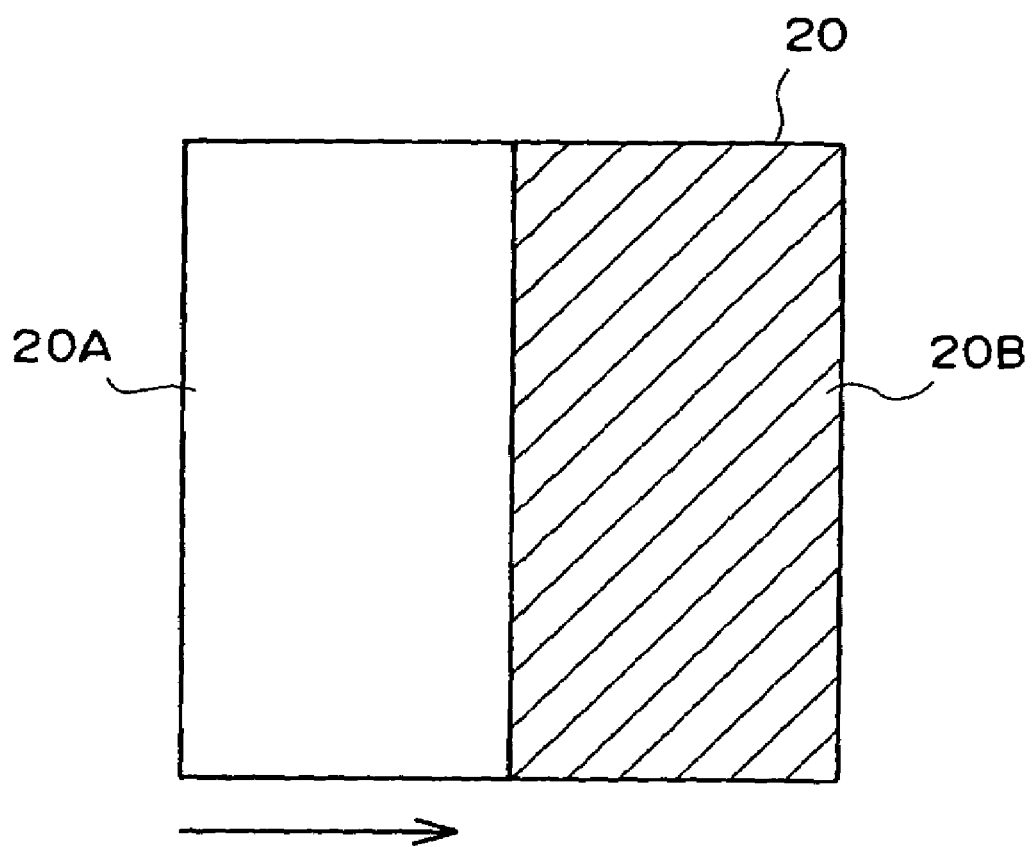

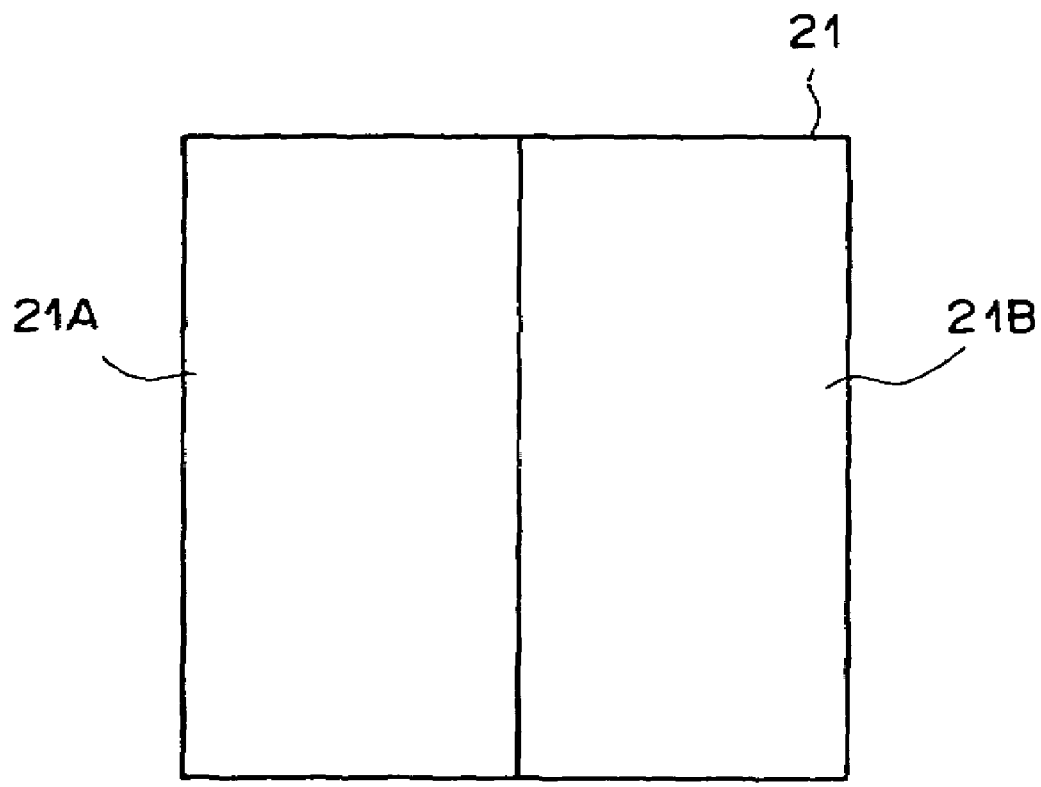

F I G . 12
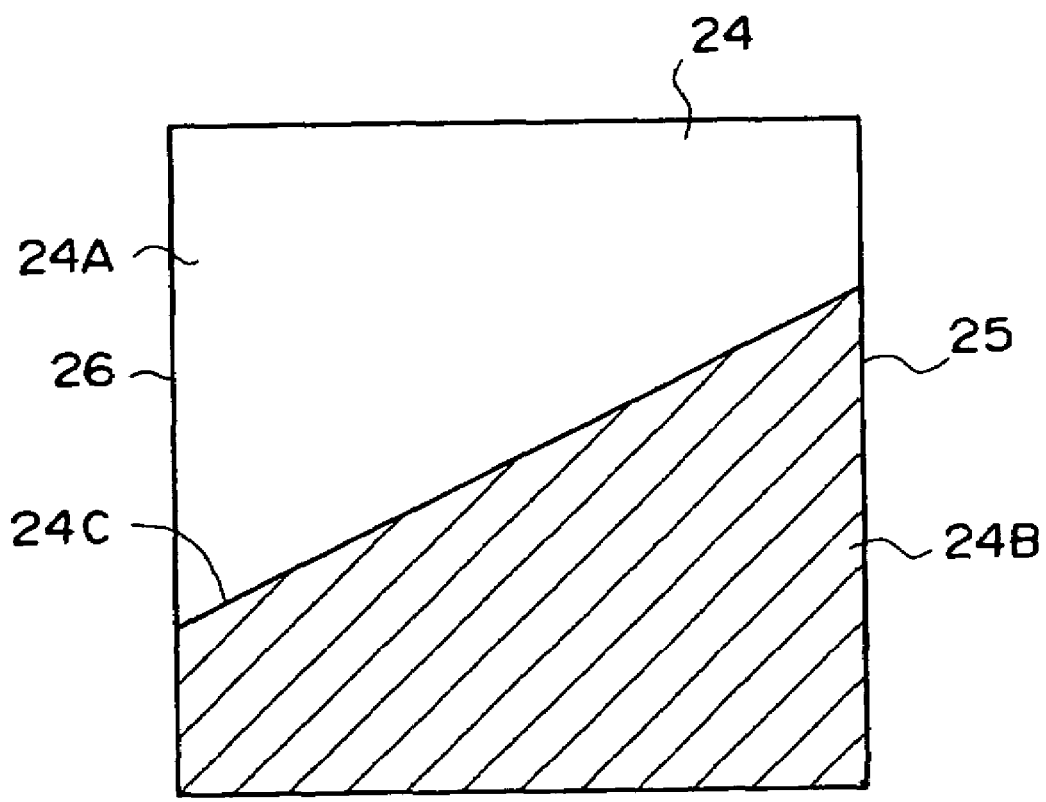

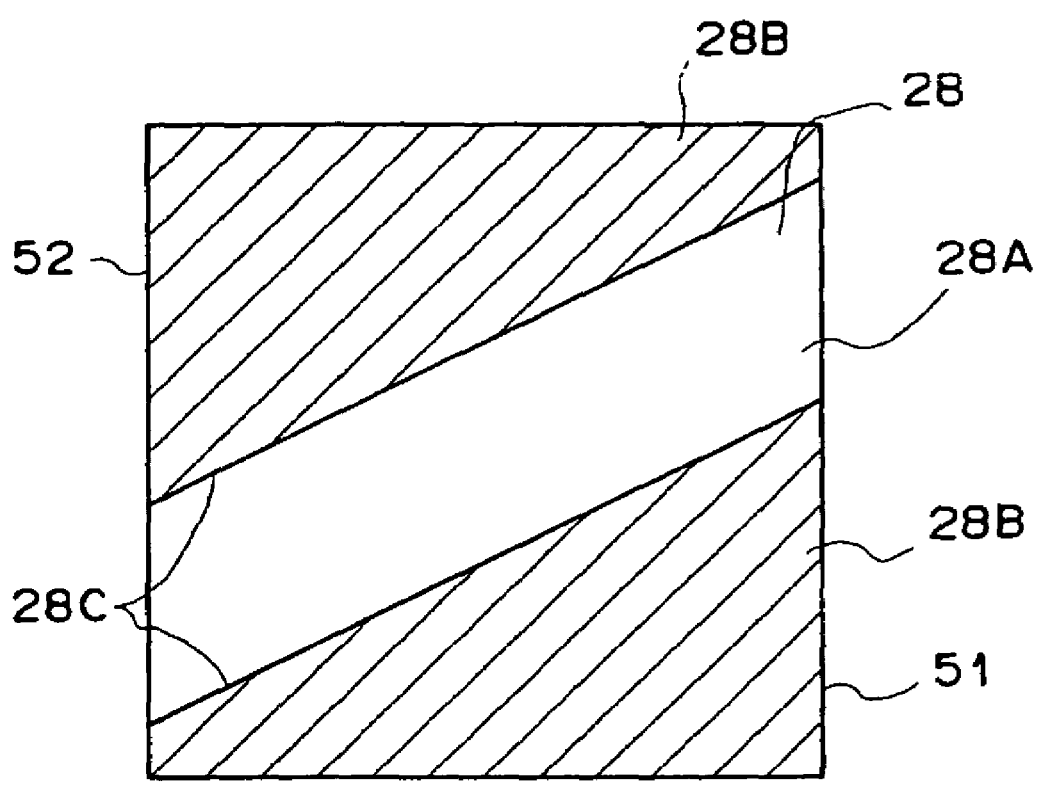
F I G .15

METHOD OF INSPECTING STRAY LIGHT THAT OCCURS IN A RADIATION IMAGE READER

BACKGROUND OF THE INVENTION

1. Field of the Invention

The present invention relates to a method of inspecting stray light that occurs in a radiation image reader in which excitation light is illuminated to a storable fluorescent sheet having stored and recorded a radiation image, to obtain an image signal representing the radiation image, from the storable fluorescent sheet.

2. Description of the Related Art

Radiation recording-reproducing systems have been proposed in Japanese Unexamined Patent Publication Nos. 55(1980)-12429, 56(1981)-11395, 55(1980)-163472, 56(1981)-164645, 55(1980)-116340, etc. These systems utilize a storable phosphor (stimulatable phosphor), which stores part of radiation energy when illuminated with radiation (such as X-rays, $\alpha$-rays, $\beta$-rays, $\gamma$-rays, electron rays, ultraviolet rays, etc.) and emits photostimulated luminescent light in accordance with the quantity of the stored radiation energy when illuminated with excitation light (such as visible light, etc.). The radiation image of a subject, such as a human body, etc., is temporarily photographed and recorded on a storable fluorescent sheet. The storable fluorescent sheet with the radiation image emits photostimulated luminescent light when scanned with excitation light such as a light beam, etc. The photostimulated luminescent light obtained is photoelectrically read and converted to an image signal by photoelectric reading means such as a photomultiplier, etc. Based on the image signal, the radiation image of the subject is output as a visible image to a recording material such as photosensitive material, etc., or to a cathode-ray tube (CRT) display unit, etc.

A radiation image reader used in the aforementioned radiation recording-reproducing system is equipped with a light source for emitting a light beam (excitation light), a rotating polygon mirror (deflection means) for reflecting and deflecting the light beam emitted from the light source, and a scanning optics system, which consists of an f$\theta$ lens, a cylindrical lens, and a cylindrical mirror. The light beam, reflected and deflected by the deflection means, is reflected by the cylindrical mirror to change the optical path and is scanned on the scan surface of the storable fluorescent sheet. Thus, the optical path of the light beam can be assured without increasing the size of the reader, by reflecting the light beam with the cylindrical mirror to change the optical path.

In the above-mentioned scanning optics system, however, the light beam is reflected at the scan surface of the storable fluorescent sheet, and the reflected light beam is further reflected by the cylindrical mirror and returns to the cylindrical lens. Because of this, there is a possibility that the return light will be reflected at the surface of the cylindrical lens and will be incident again upon the scan surface as stray light. In certain cases, the light beam, reflected and deflected by the deflection means, is reflected by the scanning optics means and returns to the deflection means, and this return light is incident again on the scan surface as stray light. The stray light always occurs at the same position on the horizontal scanning line. Therefore, if stray light occurs in the radiation image reader mentioned above, the storable fluorescent sheet will be excited by this stray light and emit photostimulated fluorescent light, and consequently, noise in the form of lines extending in the vertical scanning direction will develop in the obtained image signal. Therefore, it is necessary to inspect stray light when shipping radiation image readers and to ship only readers having passed the inspection.

SUMMARY OF THE INVENTION

The present invention has been made in view of the above-mentioned circumstances. Accordingly, it is the primary object of the present invention to provide an inspection method that is capable of inspecting stray light that occurs in a radiation image reader.

To achieve this end and in accordance with an important aspect of the present invention, there is provided a method of inspecting influence of stray light which occurs in a radiation image reader equipped with horizontal scanning means for scanning excitation light on a storable fluorescent sheet, having stored and recorded a radiation image, in a horizontal scanning direction; vertical scanning means for scanning the storable fluorescent sheet in a vertical scanning direction approximately perpendicular to the horizontal scanning direction; and reading means for obtaining an image signal which represents the radiation image by photoelectrically reading the radiation image, stored and recorded in the storable fluorescent sheet, by the horizontal scanning of the excitation light. The inspection method comprises the steps of: preparing a storable fluorescent inspection sheet that has stored and recorded a radiation inspection image which has a density pattern in which one or more low-density and high-density regions having a contrast difference of at least 1:20 are arrayed in the horizontal scanning direction; obtaining an image inspection signal representing the radiation inspection image, by photoelectrically reading the radiation inspection image from the storable fluorescent inspection sheet with the reading means; and inspecting the influence of stray light, based on an image reproduced from the image inspection signal.

Note that it is desirable that the contrast difference be 1:20 or greater, preferably 1:50 or greater.

In the inspection method, the boundary line, in the radiation inspection image, between the low-density and high-density regions may be constructed by a straight line and may be inclined with respect to the horizontal scanning direction so that it intersects both edges of the radiation inspection image which extend in the vertical scanning direction.

The expression "the boundary line is inclined with respect to the horizontal scanning direction so that it intersects both edges of the radiation inspection image which extend in the vertical scanning direction" means that the boundary line is inclined with respect to the horizontal scanning direction and that the boundary line forms a density pattern by intersecting with the edges of the radiation inspection image which extend in the vertical scanning direction. Note that in cases where the radiation inspection image is rectangular in shape, the boundary line may be on the diagonal of the rectangular shape.

In the inspection method, the density pattern in the radiation inspection image may include two high-density regions and one low-density region. The regions may be arrayed in the horizontal scanning direction in the order of one high-density region, the low-density region, and the other high-density region.

In accordance with another important aspect of the present invention, there is provided a storable fluorescent inspection sheet having stored and recorded a radiation inspection image that has a density pattern in which one or more low-density and high-density regions having a contrast difference of at least 1:20 are arrayed in the horizontal scanning direction.

In the storable fluorescent inspection sheet, the boundary line, in the radiation inspection image, between the low-density and high-density regions may be constructed by a straight line and may be inclined with respect to the horizontal scanning direction so that it intersects both edges of the radiation inspection image which extend in the vertical scanning direction. In this case, it is preferable that the density pattern in the radiation inspection image include two high-density regions and one low-density region. The regions may be arrayed in the horizontal scanning direction in the order of one high-density region, the low-density region, and the other high-density region.

In accordance with still another important aspect of the present invention, there is provided a method of generating the aforementioned storable fluorescent inspection, comprising the steps of: disposing a radiation shielding member at a position corresponding to the density pattern on a storable fluorescent sheet; illuminating the storable fluorescent sheet, on which the shielding member has been disposed, with a dose of radiation that corresponds to the contrast difference; and storing and recording the radiation inspection image in the storable fluorescent sheet, by repeating the disposition of the radiation shielding member and the illumination of the radiation, with respect the storable fluorescent sheet until the density pattern is obtained.

In accordance with yet still another important aspect of the present invention, there is provided a method of generating the aforementioned storable fluorescent inspection sheet, comprising the steps of: disposing a radiation transmittable member at a position corresponding to the density pattern on a storable fluorescent sheet, the radiation transmittable member having a radiation transmission factor which corresponds to the contrast difference; and storing and recording the radiation inspection image in the storable fluorescent sheet, by illuminating the storable fluorescent sheet, on which the radiation transmittable member has been disposed, with a dose of radiation that corresponds to the contrast difference.

As described above, stray light always develops at the same position on the horizontal scanning direction. Therefore, if the storable fluorescent inspection sheet (which has stored and recorded a radiation inspection image that has a density pattern in which one or more low-density and high-density regions having a contrast difference of at least 1:20 are arrayed in the horizontal scanning direction) is read, and if stray light occurs in the high-density region during reading in the low-density region, noise in the form of a line extending in the vertical scanning direction will occur at a position being read because of the influence of the stray light. Therefore, in the case where a reproduced image is obtained by reproducing an image inspection signal obtained by reading the storable fluorescent inspection sheet, and noise in the form of a line extending in the vertical scanning direction occurs in the reproduced image, it can be judged that stray light has occurred in this radiation image reader. Thus, stray light in the radiation image reader can be inspected by employing the aforementioned storable fluorescent inspection sheet.

In addition, in the case where the boundary line between the low-density and high-density regions is constructed by a straight line and is inclined with respect to the horizontal scanning direction, in the area where the low-density region is wide it is difficult to visually recognize noise resulting from stray light, even if the stray light occurs in the low-density region during reading in the low-density region. Since, however, the boundary line is inclined so that it intersects both edges of the radiation inspection image that extend in the vertical scanning direction, the stray light that occurs on any of the horizontal scanning lines during reading in the low-density region will always be illuminated on the high-density region, if the whole surface of the storable fluorescent inspection sheet is scanned in the horizontal scanning direction. Therefore, at the time stray light has been illuminated on the high-density region, noise resulting from stray light occurs in the low-density region. As a result, stray light can be inspected with reliability. Besides, the position at which stray light occurs can also be specified, because the intersection between the horizontal scanning line, which passes a point where noise develops or disappears, and the boundary line represents the position where stray light has occurred.

Furthermore, even if stray light occurs at either a position where reading has finished, or a position where reading has not finished, during horizontal scanning at a certain horizontal scanning line, in the case where the density pattern is constructed of a high-density region, a low-density region, and a high-density region arrayed in the horizontal scanning direction in the recited order, if the whole surface of the storable fluorescent inspection sheet is scanned in the horizontal scanning direction the stray light occurring at any of the horizontal scanning lines during reading in the low-density region is always illuminated on the high-density region and noise resulting from the stray light occurs in the low-density region. Therefore, if the density pattern is constructed of a high-density region, a low-density region, and a high-density region arrayed in the horizontal scanning direction, stray light can be inspected regardless of the position at which the stray light occurs.

BRIEF DESCRIPTION OF THE DRAWINGS

The present invention will be described in further detail with reference to the accompanying drawings, in which:

FIGS. 3 through 5 are diagrams used for explaining stray light;

FIG. 6 is a diagram showing a radiation inspection image, stored and recorded in the storable fluorescent inspection sheet generated according to the first embodiment of the present invention;

FIG. 7 is a diagram showing the storable fluorescent inspection sheet;

FIG. 12 is a diagram showing a radiation inspection image, stored and recorded in a storable fluorescent inspection sheet generated according to a second embodiment of the present invention;

FIG. 15 is a diagram showing a radiation inspection image, stored and recorded in a storable fluorescent inspection sheet generated according to a third embodiment of the present invention.

DESCRIPTION OF THE PREFERRED EMBODIMENTS

Figure 1:
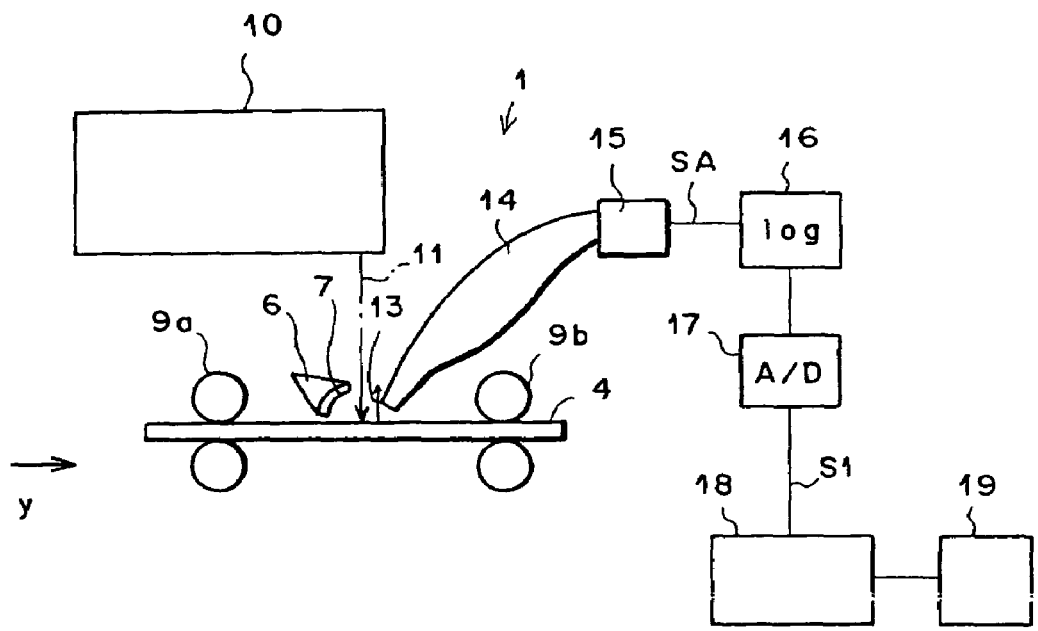
FIG. 1 is a schematic diagram showing a radiation image reader in which an inspection of stray light is made by an inspection method in accordance with a first embodiment of the present invention.

Preferred embodiments of the present invention will hereinafter be described in detail with reference to the drawings. As illustrated in FIG. 1, a radiation image reader 1 is equipped with conveyor rollers 9a, 9b for conveying a storable fluorescent sheet 4 in the direction of arrow y. The rollers 9a, 9b are rotated by a motor (not shown), and the storable fluorescent sheet 4 has stored and recorded a radiation image. Above the sheet 4 that is conveyed, an optics unit 10 is disposed for emitting laser light 11 being excitation light. The laser light 11 scans the sheet 4 in the horizontal scanning direction perpendicular to the paper surface. Above the position where the sheet 4 is scanned in the horizontal scanning direction with the laser light 11, a collective guide 14, for collecting the photostimulated luminescent light 13 emitted from the sheet 4 by the horizontal scanning of the laser light 11, is disposed in proximity to the conveying passage of the sheet 4. Near the collective guide 14, a collective mirror 7 is disposed for reflecting the photostimulated luminescent light 13, scattered and emitted from the storable fluorescent sheet 4, toward the collective mirror 7. The collective mirror 7 is supported by a mirror mount 6. The collective guide 14 is connected with a photomultiplier 15, which photoelectrically detects the photostimulated luminescent light 13. This photomultiplier 15 is connected to a logarithmic amplifier 16, which is in turn connected to an A/D converter 17. The A/D converter 17 is connected to storage means 18, which is in turn connected to image processing means 19.

Figure 2:
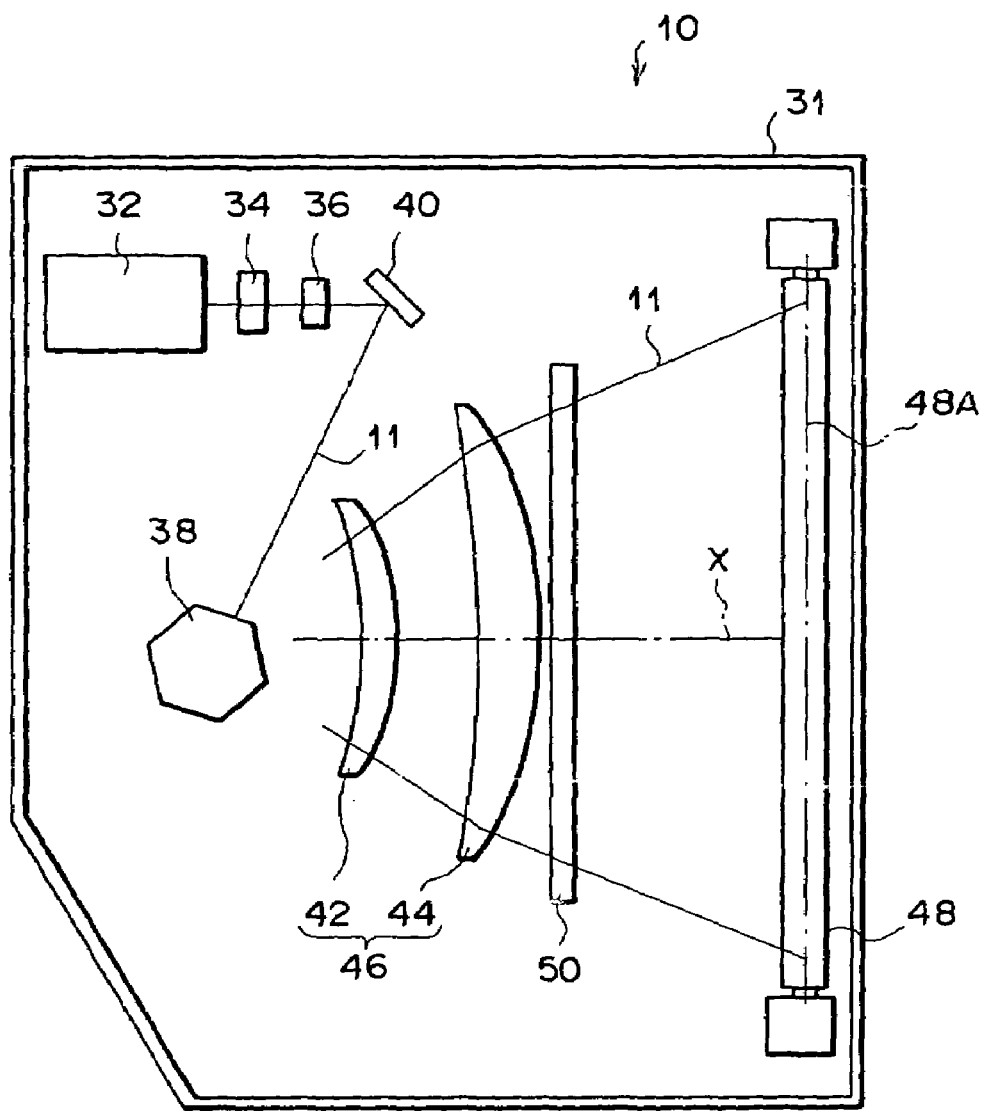
FIG. 2 is a plan view showing the construction of the optics unit shown in FIG. 1.

FIG. 2 shows the construction of the optics unit 10. As illustrated in the figure, the optics unit 10 is equipped with (1) a light source 32 for emitting laser light 11; (2) a collimator lens 34 for collimating the laser light 11; (3) a cylindrical lens 36 for converging the laser light 11 in the vertical scanning direction (i.e., the direction of arrow y shown in FIG. 1); (4) a reflection mirror 40 for reflecting the laser light 11; (5) a rotating polygon mirror 38, which is driven by a motor (not shown), for reflecting and deflecting the laser light 11 reflected by the reflection mirror 40; (6) an fθ lens 46, which consists of first and second spherical lenses 42 and 44, for projecting the laser light 11, reflected and deflected by the rotating polygon mirror 38, onto the sheet 4; (7) a cylindrical mirror 48 for reflecting the laser light 11 toward the sheet 4; and (8) a cylindrical lens 50 which constitutes an imaging optics system for projecting the laser light 11 onto the sheet 4, along with the cylindrical mirror 48. These components are disposed within a housing 31. Note that in FIG. 2 the optical axis of the laser light 11 is represented by X and the reflection surface of the cylindrical mirror 48 by 48A.

Now, the operation of the radiation image reader 1 will be described in detail. The storable fluorescent sheet 4 having stored and recorded the radiation image of a subject is set on the conveyor roller 9a. Then, the set storable florescent sheet 4 is conveyed in the direction of arrow y (i.e., the vertical scanning direction) by the conveyor rollers 9a, 9b. In the optics unit 10, on the other hand, the laser light 11 emitted from the light source 32 is reflected and deflected by the rotating polygon mirror 38 and is further reflected toward the sheet 4 by the cylindrical mirror 48. Next, the reflected laser light 11 is incident on the sheet 4 and scans the sheet 4 in the horizontal scanning direction approximately perpendicular to the vertical scanning direction. If the sheet 4 is scanned with the laser 11, the photostimulated luminescent light 13, which has a quantity of light corresponding to radiation image information being stored and recorded in the sheet 4, is emitted from a position on the sheet 4 irradiated with the laser light 11. The photostimulated luminescent light 13 emitted from the surface of the sheet 4 is scattering. However, the scattering light 13 is reflected by the collective mirror 7 and is collected by the collective guide 14. The photostimulated luminescent light 13 incident within the collective guide 14 travels through the collective guide 14, repeating total reflection. The photostimulated luminescent light 13 is received by the photomultiplier 15, in which the light quantity of the photostimulated fluorescent light 13 representing the radiation image is converted to an analog image signal SA.

The analog image signal SA output from the photomultiplier 15 is logarithmically amplified by the logarithmic amplifier 16 and input to the A/D converter 17. The A/D converter 17 samples the amplified signal and converts the sampled signal to a digital image signal S1. The digital image signal S1 is input to the storage means 18. The digital image signal S1 stored in the storage means 18 is input to the image processing means 19, in which the signal S1 is subjected to a predetermined image processing. In reproduction means (not shown), the processed digital image signal S1 is used for reproduction of the radiation image. This reproduction means may be display means such as a CRT display, etc., or a recorder for performing optical scanning and recording operations on photosensitive film.

Figure 3:
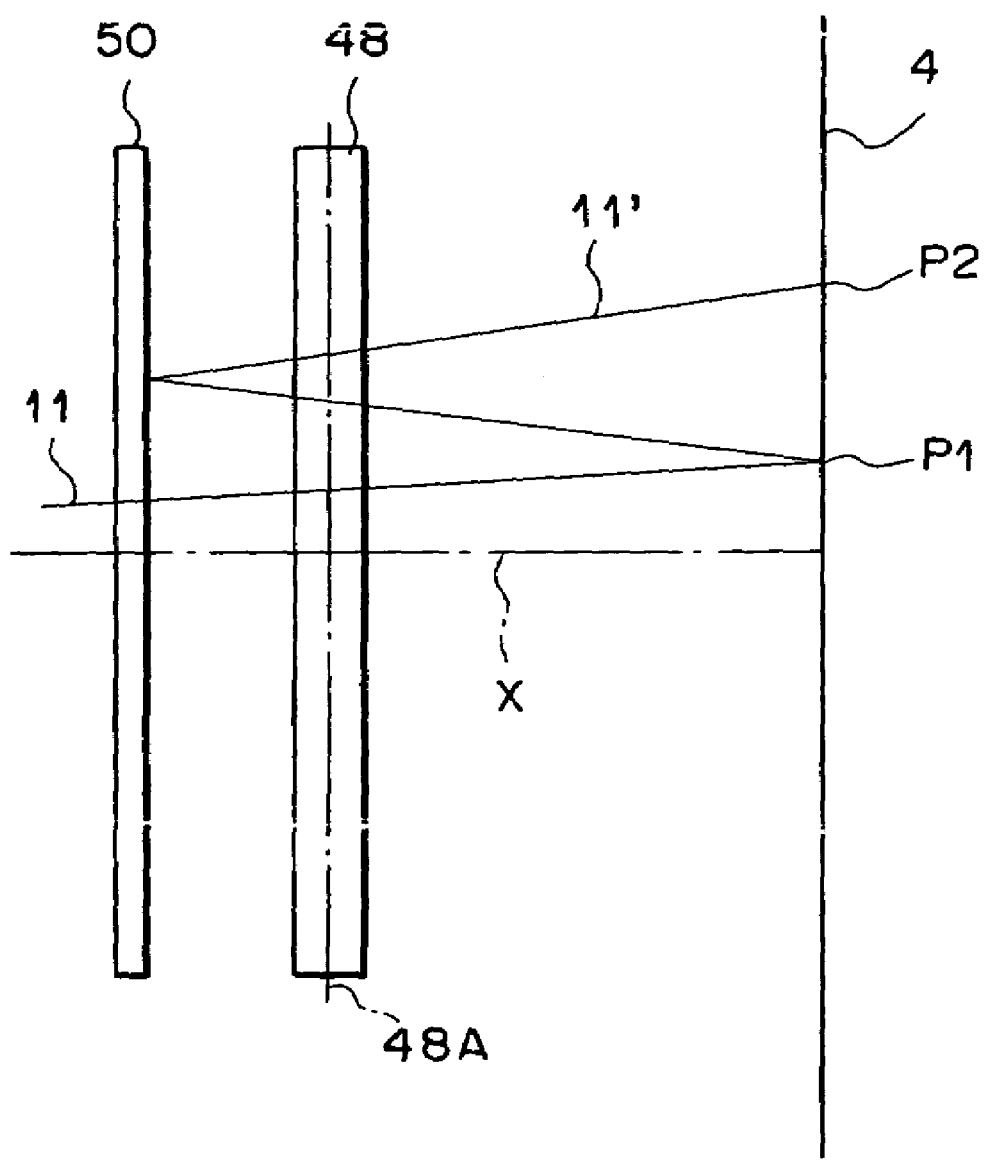
Figure 4:
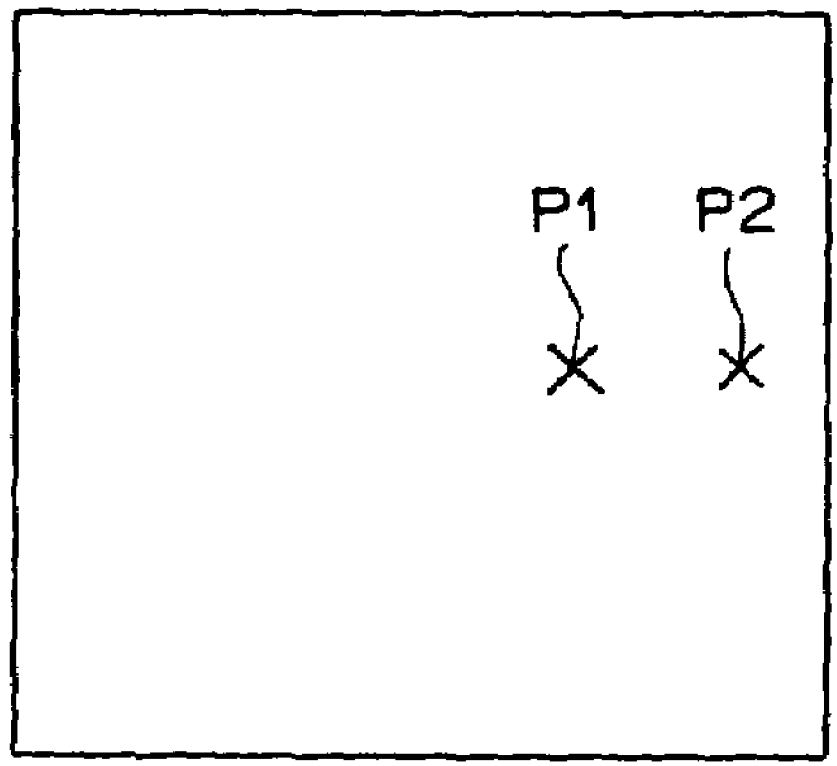

Here, stray light will be described in detail with reference to FIGS. 3 and 4. Note that in FIG. 3, the laser light 11, reflected toward the sheet 4 by the cylindrical mirror 48, and the laser light 11 before reflection, are in the same plane for the purpose of explanation. As illustrated in FIGS. 3 and 4, the laser light 11 is reflected toward the sheet 4 by the cylindrical mirror 48 and is projected at position P1 on the sheet 4. The laser light 11 projected at the position P1 is reflected at the surface of the sheet 4 toward the cylindrical mirror 48 and is further reflected at the cylindrical mirror 48 toward the cylindrical lens 50. Then, the laser light 11 reflected toward the cylindrical lens 50 is reflected as stray light 11' at the surface of the cylindrical lens 50 toward the sheet 4. Because the laser light 11 is incident on the sheet 4 at an angle to an optical axis X, as illustrated in FIG. 3, the stray light 11' is projected at position P2 away from position P1.

If the projected position P1 of the laser light 11 differs from the projected position P2 of the stray light 11', as described above, the following problems will arise. That is, assuming the intensity of the laser light 11 is 1, the positive reflection component of the storable fluorescent sheet 4 is 5% and that the reflection factor of the surface of the cylindrical lens 50 is 0.5%, the intensity of the stray light 11' at the position P2 becomes $2.5 \times 10^{-4}$. Therefore, if it is assumed that the intensities of radiation illuminated at the positions P1 and P2 are approximately the same when the radiation image reader 1 reads a radiation image from the storable fluorescent sheet 4 having stored and recorded the radiation image, the intensity of the signal obtained at the position P1 becomes $1+2.5\times10^{-4}$ in view of the influence of the stray light 11' and therefore there is little influence of the stray light 11'.

However, when the radiation image recorded on the storable fluorescent sheet 4 is a human breast image such as that shown in FIG. 5, and the position P1 is located at the lung field portion and the position P2 at a position where radiation is directly illuminated without being passed through the human body, there are cases where the ratio of the intensities of radiation at the positions P1 and P2 on the storable fluorescent sheet 4 becomes 1:200. In such cases, the intensity of a signal obtained at the position P1 becomes $1+2.5\times10^{-4}\times200=1.05$ in view of the stray light 11' and therefore there is a great influence of the stray light 11'.

This embodiment provides a method of inspecting the aforementioned influence of the stray light 11'. For this purpose, this embodiment makes an inspection of stray light by employing a storable fluorescent inspection sheet. The storable fluorescent sheet has stored and recorded a radiation inspection image 20 that has a density pattern consisting of a low-density region 20A and a high-density region 20B, as shown in FIG. 6. Note that the radiation inspection image 20 shown in FIG. 6 is obtainable by illuminating a low dose of radiation (e.g., 1 mR) to a region 21A on a storable fluorescent sheet and a high dose of radiation (e.g., 50 mR) to a region 21B, as shown in FIG. 7. Here, a storable fluorescent sheet having stored and recorded the radiation inspection image 20 is taken to be a storable fluorescent inspection sheet 21. Note that in this embodiment, the horizontal direction indicated by an arrow in FIG. 1 is assumed to be a horizontal scanning direction in reading a radiation image by the radiation image reader 1.

Figure 8A:
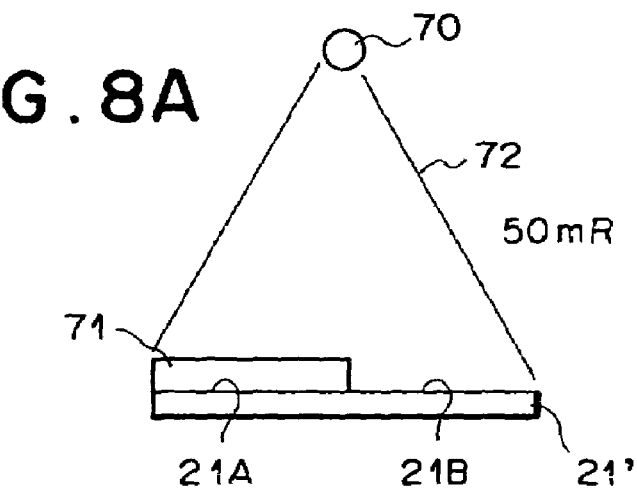
FIGS. 8A to 8C are diagrams used for explaining how the storable fluorescent inspection sheet is generated.
Figure 8B:
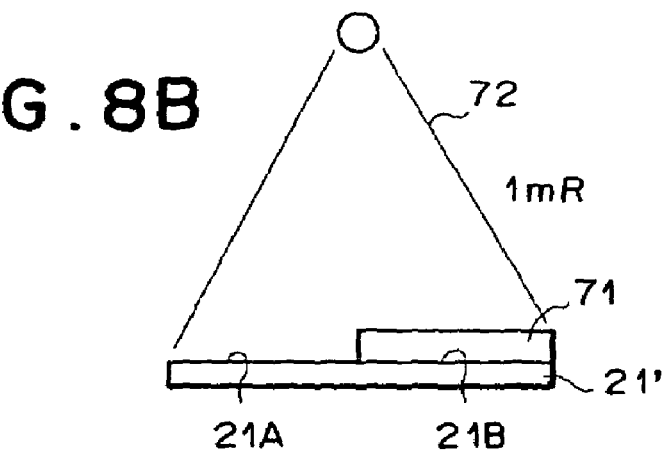

Now, a method of generating the storable fluorescent inspection sheet 21 will be described in detail with reference to FIG. 8. As illustrated in FIG. 8A, the region 2iA of a storable fluorescent sheet 21' having stored and recorded no radiation image is shielded with a radiation shielding plate 71 (e.g., a lead plate of thickness 5 mm), and the unshielded region 21B of the sheet 21' is illuminated with radiation 72 with a dose of 50 mR, emitted from a radiation source 70. Then, as illustrated in FIG. 8B, the region 21B is shielded with the shielding plate 71, and the unshielded region 21A is illuminated with radiation 72 with a dose of 1 mR, emitted from the radiation source 70. In this manner, the storable fluorescent inspection sheet 21 having stored and recorded the radiation inspection image 20 can be obtained as illustrated in FIG. 6.

Figure 8C:
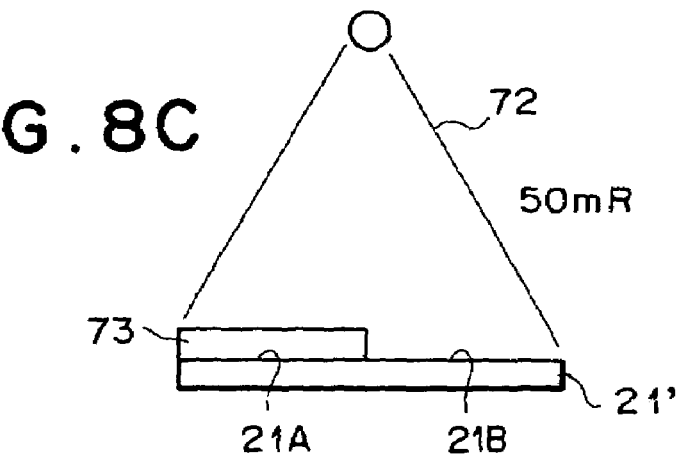

Note that the region 21B may first be shielded with the shielding plate 71 and, after the illumination of the sheet 21' with the radiation 72 of a dosage of 1 mR, the sheet 21' may be illuminated with the radiation 72 of a dosage of 5 mR without employing the shielding plate 71. Even in this case, the storable fluorescent inspection sheet 21 having stored and recorded the radiation inspection image 20 is obtainable. Furthermore, instead of the shielding plate 71, the region 21A may be shielded with a radiation transmittable plate 73, constructed of a copper plate, etc., which has a transmission factor of 2%, and the sheet 21' may be illuminated with radiation 72 of dosage 50 mR, emitted from the radiation source 70, as illustrated in FIG. 8C. In this case, the region 21A and the region 21B are illuminated simultaneously with the 1-mR radiation 72 and the 50-mR radiation, respectively.

Therefore, the storable fluorescent inspection sheet 21 having stored and recorded the radiation inspection image 20 can be obtained by a single photographing.

Figure 9:
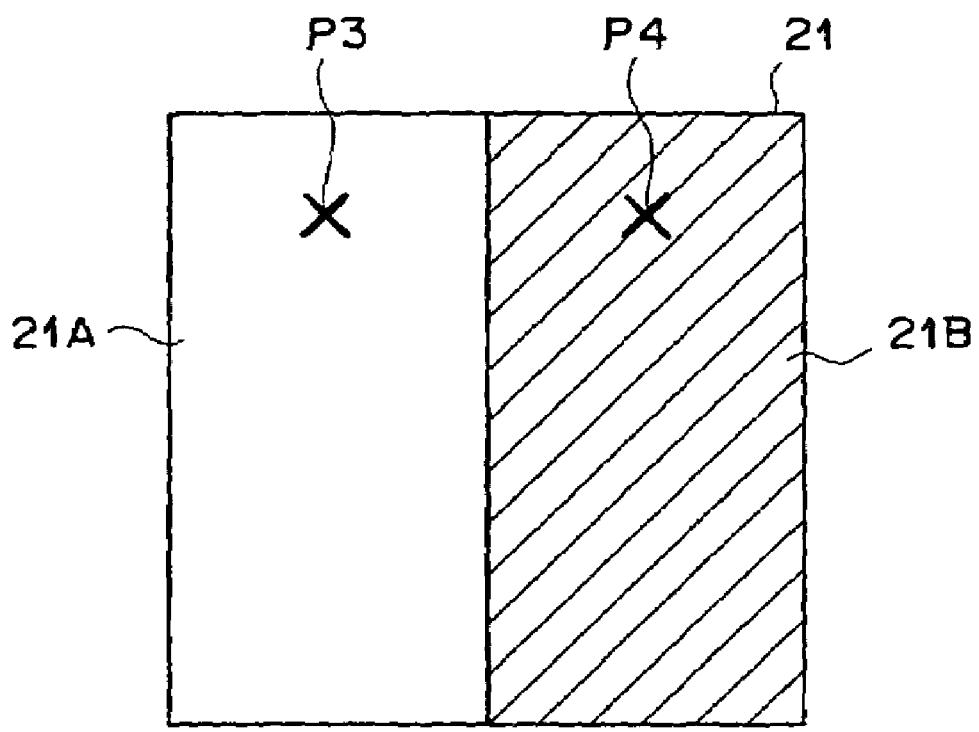
FIG. 9 is a diagram used to explain an inspection of stray light.
Figure 10:
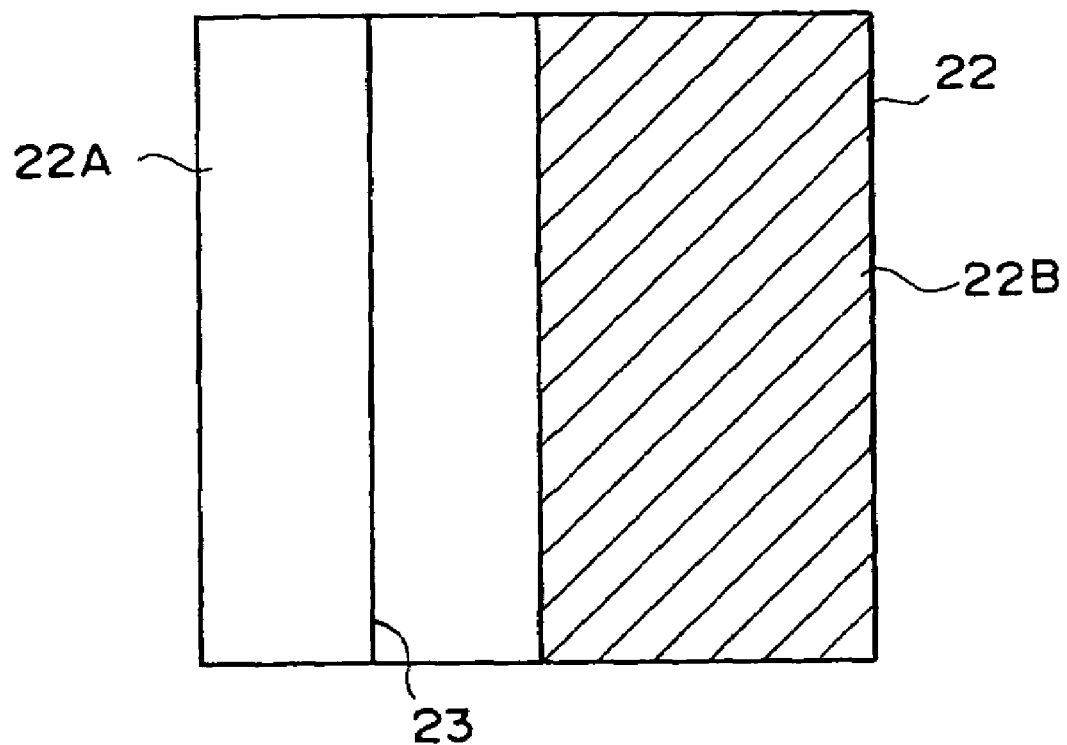
FIG. 10 is a diagram showing an image obtained by reading the storable fluorescent inspection sheet.

The inspection of stray light is carried out by reading the aforementioned storable fluorescent inspection sheet 21 with the radiation image reader 1. The inspection of stray light will be described with reference to FIG. 9. Assuming that, in the radiation image reader 1, stray light develops at a position P4 during reading at position P3 shown in FIG. 9, a low-density region 22A and a high-density region 22B will develop in an image 22 obtained by reading the storable fluorescent inspection sheet 21, and noise 23 in the form of a line extending in the vertical scanning direction will develop at the position corresponding to the position P3 on the low-density region 22A, as shown in FIG. 10.

Therefore, by reading the storable fluorescent inspection sheet 21 having stored and recorded the radiation inspection image 20 that has the density pattern shown in FIG. 6, and by recognizing the image obtained by the reading, stray light in the radiation image reader 1 used in the reading can be inspected.

Figure 11:
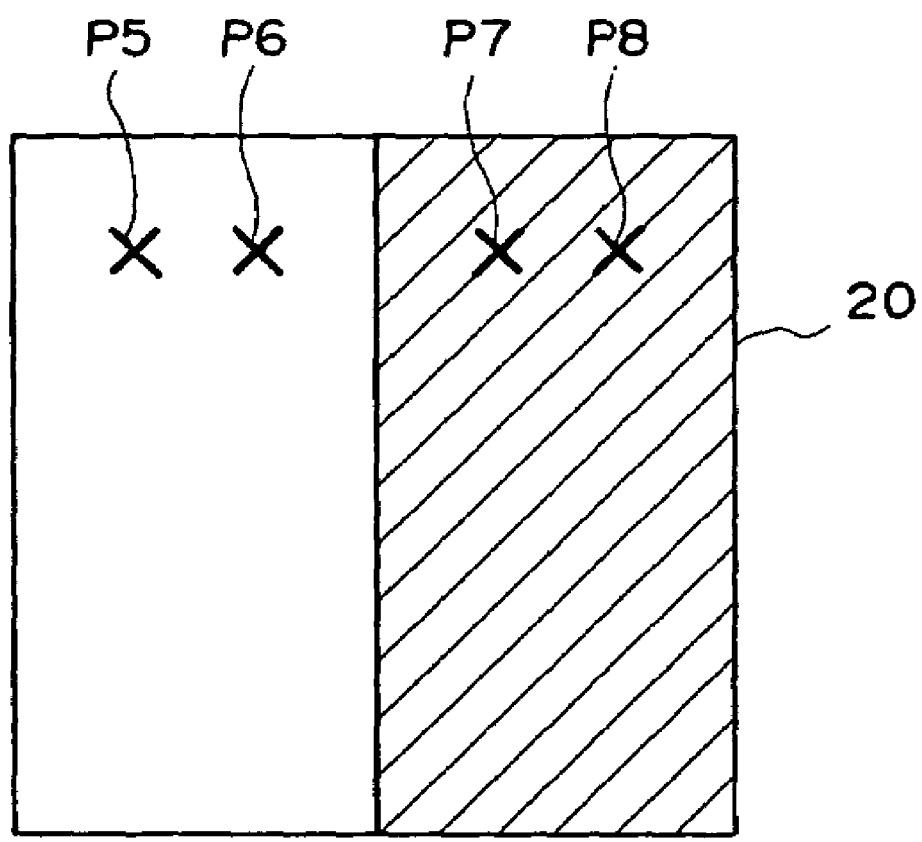
FIG. 11 is a diagram showing the positions in the storable fluorescent inspection sheet where reading is performed.

Note that in the case where, in the radiation inspection image 20 such as that shown in FIG. 6, stray light develops at position P6 during reading at position P5 and develops at position P8 during reading at position P7, as shown in FIG. 11, it is difficult to inspect the stray light because noise in the form of a line is inconspicuous in an image obtained. It is therefore preferable to employ the storable fluorescent inspection sheet 21 having stored and recorded a radiation inspection image 24 such as the one shown in FIG. 12. The radiation inspection image 24 has a density pattern such that a boundary line 24C between a low-density region 24A and a high-density region 24B is inclined with respect to the horizontal scanning direction of the radiation inspection image 24 and that the boundary line 24C intersects the vertical edges 25 and 26, extending the vertical scanning direction, of the radiation inspection image 24. A description will hereinafter be made of how stray light is inspected by use of the storable fluorescent inspection sheet 21 having stored and recorded the radiation inspection image 24.

Figure 13:
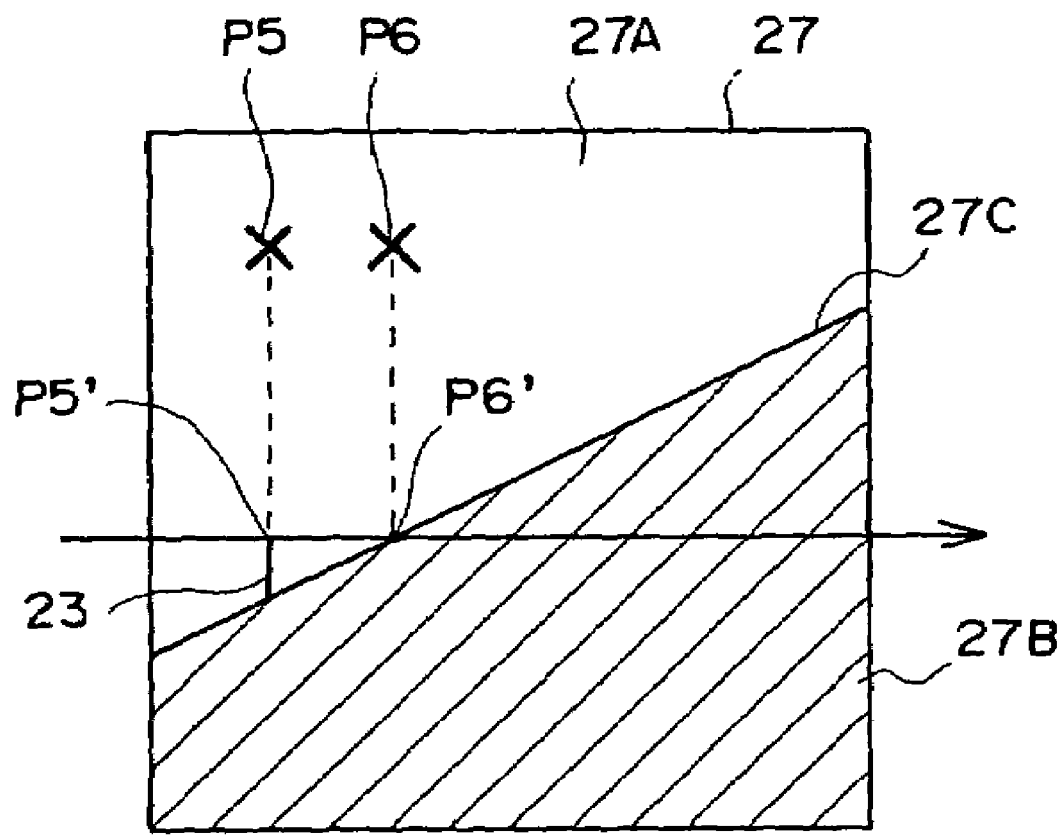
FIG. 13 is a diagram showing how stray light is inspected by use of the storable fluorescent inspection sheet of the second embodiment.

FIG. 13 illustrates how an inspection of stray light is carried out by use of the storable fluorescent inspection sheet 21 shown in FIG. 12. Assume that in the radiation image reader 1, stray light develops at the position P6 shown in FIG. 11 during reading at the position P5. As illustrated in FIG. 13, a low-density region 27A and a high-density region 27B develop in an image 27, obtained by reading the storable fluorescent inspection sheet 21. In the case where the positions P5 and P6 on a certain horizontal scanning line are both in the low-density region 24A of the radiation inspection image 24, noise resulting from stray light is inconspicuous. However, in the case where the horizontal scanning line is moved by vertical scanning during reading of the storable fluorescent inspection sheet 21, and the position P5 is in the low-density region 24A and the position P6 in the high-density region 24B, noise 23 in the form of a line extending in the vertical scanning direction will develop at the position in the image 27 that corresponds to the position P5 in the low-density region 27A. Therefore, using the storable fluorescent inspection sheet 21 having stored and recorded the radiation inspection image 24 that has the density pattern shown in FIG. 12, stray light can be inspected with reliability. In the image 27 obtained from a storable fluorescent inspection sheet 21 such as this, if the intersection between the horizontal scanning line, passing through point P5' where the noise 23 develops, and the boundary line 27C (between the low-density region 27A and the high-density region 27B) is taken to be P6', the intersection P6' represents the position at which stray light develops. Therefore, the position at which stray light develops can also be found by use of the storable fluorescent inspection sheet 21 having stored and recorded the radiation inspection image 24 shown in FIG. 12.

Figure 14:
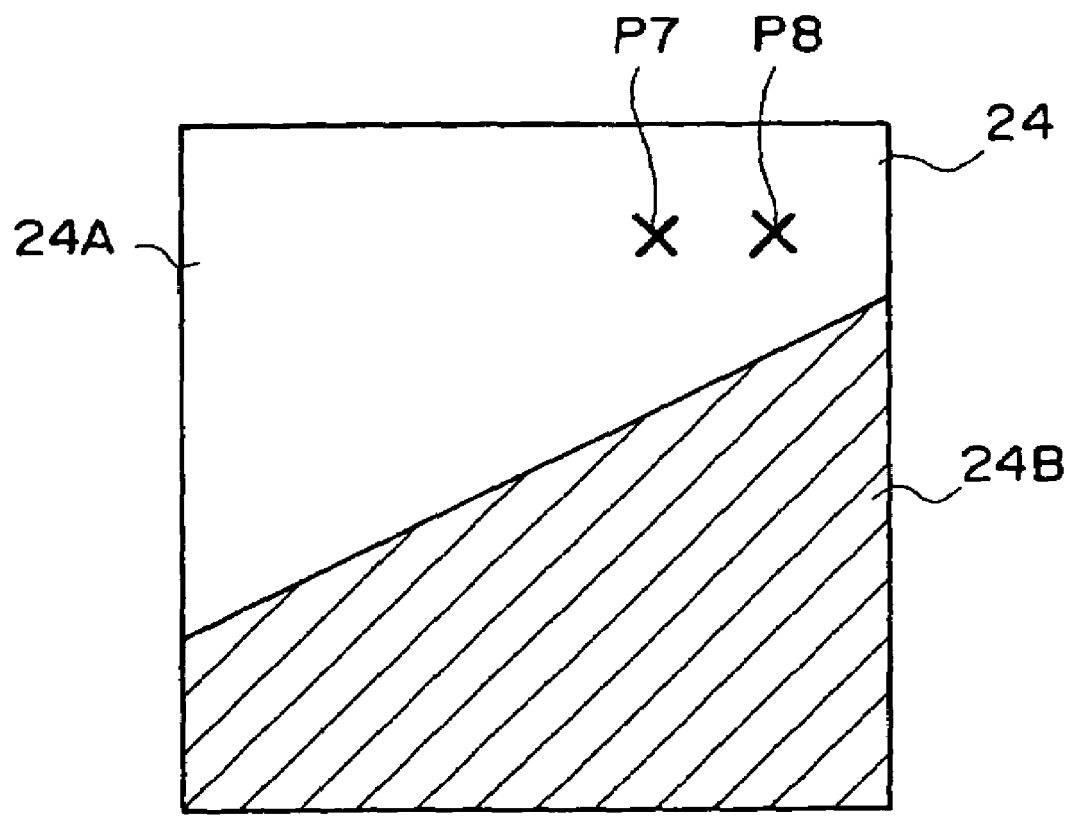
FIG. 14 is a diagram showing the positions in the storable fluorescent inspection sheet of the second embodiment where reading is performed.

On the other hand, in the case where stray light develops at position P7 during reading at position P8 shown in FIG. 14 even when using the storable fluorescent inspection sheet 21 having stored and recorded the radiation inspection image 24, stray light cannot be inspected, because, in the radiation inspection image 24 shown in FIG. 12, noise in the form of a line is inconspicuous in an obtained image even when the position P7 is in the low-density region 24A and the position P8 in the high-density region 24B, as well as when the positions P7 and P8 are both in the low-density region 24A or high-density region 24B. It is therefore preferable to employ a storable fluorescent inspection sheet 21 having stored and recorded a radiation inspection image 28 such as shown in FIG. 15. The radiation inspection image 28 has one low-density region 28A and two high-density regions 28B and also has a density pattern such that the low-density region 28A is interposed between the two high-density regions 28B, each boundary line 28C between the regions 28A and 28B is inclined with respect to the horizontal scanning line, and each boundary line 28C intersects the edges 51 and 52, extending in the vertical scanning direction, of the radiation inspection image 28. A description will hereinafter be given of how stray light is inspected by use of the storable fluorescent inspection sheet 21 having stored and recorded the radiation inspection image 28.

Figure 16:
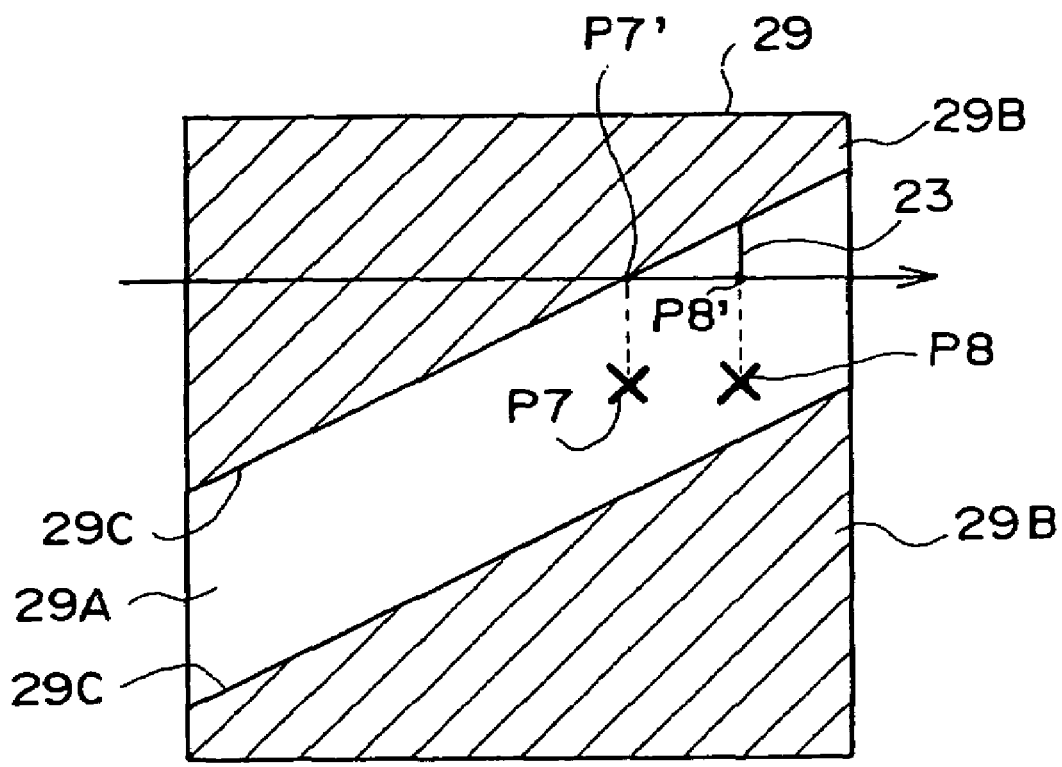
FIG. 16 is a diagram showing how stray light is inspected by use of the storable fluorescent inspection sheet of the third embodiment.

FIG. 16 illustrates how stray light is inspected by use of the storable fluorescent inspection sheet 21. Assume that in the radiation image reader 1, stray light develops at the position P7 shown in FIG. 16 during reading at the position P8. As illustrated in FIG. 16, a low-density region 29A and a high-density region 29B develop in an image 29, obtained by reading the storable fluorescent inspection sheet 21. In the case where the positions P7 and P8 on a certain horizontal scanning line are both in the high-density region 28B of the radiation inspection image 28, noise resulting from stray light is inconspicuous. However, in the case where the horizontal scanning line is moved by vertical scanning during reading of the storable fluorescent inspection sheet 21, and the position P8 is in the low-density region 28A and the position P7 in the high-density region 28B, noise 23 in the form of a line extending in the vertical scanning direction will develop at the position in the image 29 that corresponds to the position PB in the low-density region 29A. Therefore, using the storable fluorescent inspection sheet 21 having stored and recorded the radiation inspection image 28 that has the density pattern shown in FIG. 15, stray light can be inspected no matter what position stray light develops at. In the image 29 obtained from a storable fluorescent inspection sheet 21 like this, if the intersection between the horizontal scanning line, passing through point P8' where the noise 23 disappears, and the boundary line 29C (between the low-density region 29A and the high-density region 29B) is expressed in terms of P7', the intersection P7' represents the position at which stray light develops. Therefore, the position where stray light develops can also be found by use of the storable fluorescent inspection sheet 21 having stored and recorded the radiation inspection image 28 shown in FIG. 15.

While, in the aforementioned embodiments, the inspection of stray light in the radiation image reader 1 has been carried out by use of the storable fluorescent inspection sheets 21 having stored and recorded the radiation inspection images 20, 24, and 28, the present invention is not limited to these radiation inspection images, but is also applicable to any radiation inspection image if it has a density pattern in which one or more low-density and high-density regions having a contrast difference of at least 1:20 are arrayed in the horizontal scanning direction.

What is claimed is:

1. A method of inspecting influence of stray light which occurs in a radiation image reader equipped with horizontal scanning means for scanning excitation light on a storable fluorescent sheet, having stored and recorded a radiation image, in a horizontal scanning direction, vertical scanning means for scanning said storable fluorescent sheet in a vertical scanning direction approximately perpendicular to said horizontal scanning direction, and reading means for obtaining an image signal which represents said radiation image by photoelectrically reading said radiation image, stored and recorded in said storable fluorescent sheet, by the horizontal scanning of said excitation light; said inspection method comprising the steps of:

preparing a storable fluorescent inspection sheet on which a radiation inspection image has been stored and recorded, said radiation inspection image having at least one low-density region and at least one high-density region having a contrast difference of at least 1:20 between the low-density and high-density regions, a boundary line between the low-density and high-density regions extending between opposite edges of the storable fluorescent inspection sheet;

obtaining an image inspection signal representing said radiation inspection image, by photoelectrically reading said radiation inspection image from said storable fluorescent inspection sheet with said reading means; and detecting whether noise occurs in the form of a line in the vertical scanning direction in the low-density region of an image reproduced from the image inspection signal, and judging that stray light has occurred if the noise occurs and that stray light has not occurred if the noise does not occur, based on the detection of the noise.

2. The inspection method as set forth in claim 1, wherein said boundary line, in said radiation inspection image, between said low-density region and high-density region is constructed by a straight line and is inclined with respect to said horizontal scanning direction so that it intersects both edges of said radiation inspection image which extend in said vertical scanning direction.

3. The inspection method as set forth in claim 2, wherein said density pattern in said radiation inspection image includes two high-density regions and one low-density region, said regions being arrayed in said horizontal scanning direction in the order of one high-density region, the low density region, and the other high-density region.

4. A method of inspecting influence of stray light according to claim 2, wherein said radiation inspection image is rectangular in shape, wherein said boundary line is on the diagonal of said rectangular shape.

5. A method of generating a storable fluorescent inspection sheet, said storable fluorescent inspection sheet on which a radiation inspection image has been stored and recorded, said radiation inspection image having at least one low-density region and at least one high-density region having a contrast difference of at least 1:20 between the low-density and high-density regions, a boundary line between the low-density and high-density regions extending between opposite edges of the storable fluorescent inspection sheet, and wherein said boundary line, in said radiation inspection image, between said low-density and high-density regions is constructed by a straight line and is inclined with respect to said horizontal scanning direction so that it intersects both edges of said radiation inspection image which extend in said vertical scanning direction, the method comprising:

disposing a radiation shielding member at a position corresponding to said density pattern on a storable fluorescent sheet;

illuminating said storable fluorescent sheet, on which said shielding member has been disposed, with a dose of radiation that corresponds to said contrast difference; and storing and recording said radiation inspection image in said storable fluorescent sheet, by repeating the disposition of said radiation shielding member and the illumination of said radiation, with respect said storable fluorescent sheet until said density pattern is obtained.

6. A method of inspecting influence of stray light which occurs in a radiation image reader equipped with horizontal scanning means for scanning excitation light on a storable fluorescent sheet, having stored and recorded a radiation image, in a horizontal scanning direction, vertical scanning means for scanning said storable fluorescent sheet in a vertical scanning direction approximately perpendicular to said horizontal scanning direction, and reading means for obtaining an image signal which represents said radiation image by photoelectrically reading said radiation image, stored and recorded in said storable fluorescent sheet, by the horizontal scanning of said excitation light; said inspection method comprising the steps of:

preparing a storable fluorescent inspection sheet that has stored and recorded a radiation inspection image which has a density pattern in which one or more low-density and high-density regions having a contrast difference of at least 1:50 are arrayed in said horizontal scanning direction;

obtaining an image inspection signal representing said radiation inspection image, by photoelectrically reading said radiation inspection image from said storable fluorescent inspection sheet with said reading means; and detecting whether noise occurs in the form of a line in the vertical scanning direction in the low-density region of an image reproduced from the image inspection signal, and judging that stray light has occurred if the noise occurs and that stray light has not occurred if the noise does not occur, based on the detection of the noise.

7. A method of generating a storable fluorescent inspection sheet having stored and recorded a radiation inspection image that has a density pattern in which one or more low-density and high-density regions having a contrast difference of at least 1:20 are arrayed in a horizontal scanning direction comprising:

disposing a radiation shielding member at a position corresponding to said density pattern on a storable fluorescent sheet;

illuminating said storable fluorescent sheet, on which said shielding member has been disposed, with a dose of radiation that corresponds to said contrast difference; and storing and recording said radiation inspection image in said storable fluorescent sheet, by repeating the disposition of said radiation shielding member and the illumination of said radiation, with respect said storable fluorescent sheet until said density pattern is obtained.

8. A method of generating a storable fluorescent inspection sheet, wherein said storable fluorescent inspection sheet on which a radiation inspection image has been stored and recorded, said radiation inspection image having at least one low-density region and at least one high-density region having a contrast difference of at least 1:20 between the low-density and high-density regions, a boundary line between the low-density and high-density regions extending between opposite edges of the storable fluorescent inspection sheet, wherein said density pattern in said radiation inspection image includes two high-density regions and one low-density region, said regions being arrayed in said horizontal scanning direction in the order of one high-density region, the low-density region, and the other high-density region, and wherein said boundary line, in said radiation inspection image, between said low-density and high-density regions is constructed by a straight line and is inclined with respect to said horizontal scanning direction so that it intersects both edges of said radiation inspection image which extend in said vertical scanning direction, the method comprising:

disposing a radiation shielding member at a position corresponding to said density pattern on a storable fluorescent sheet;

illuminating said storable fluorescent sheet, on which said shielding member has been disposed, with a dose of radiation that corresponds to said contrast difference; and storing and recording said radiation inspection image in said storable fluorescent sheet, by repeating the disposition of said radiation shielding member and the illumination of said radiation, with respect said storable fluorescent sheet until said density pattern is obtained.

* * * * *